Sept. 25, 1956 C. W. McLEISH ET AL 2,764,736
DEVICE FOR THE PRECISE DETERMINATION OF FREQUENCY
Filed Feb. 2, 1953 2 Sheets-Sheet 1
FIG. 1
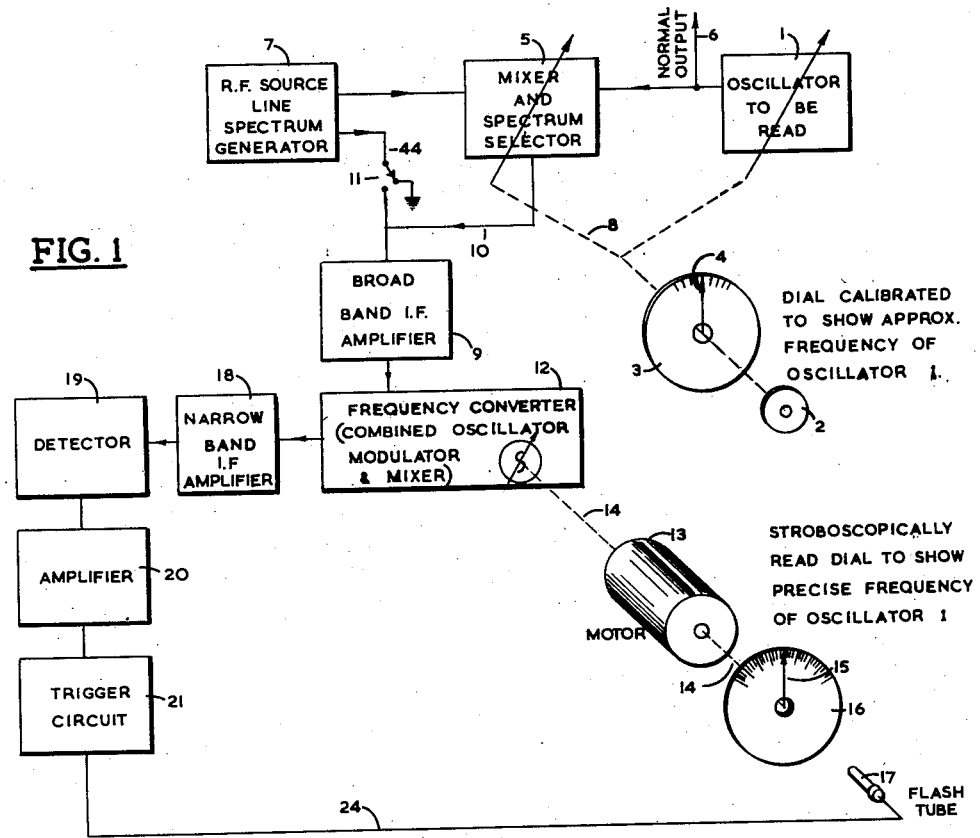
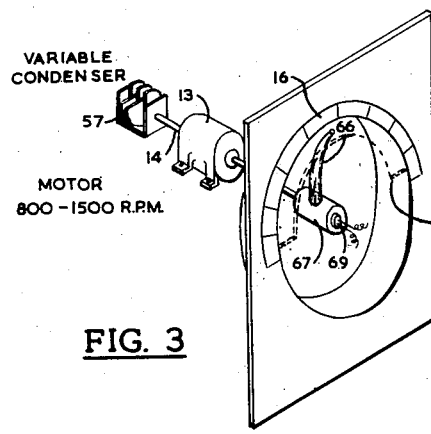
FIG. 3
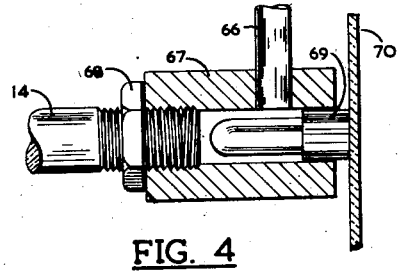
FIG. 4
CHARLES W. McLEISH
&
DALE H. RUMBLE
INVENTORS
by W. R. Meredith
ATTORNEY CHARLES W. McLEISH
&
DALE H. RUMBLE
INVENTORS by W.R.Meredith
ATTORNEY

United States Patent Office 2,764,736
Patented Sept. 25, 1956

2,764,736

DEVICE FOR THE PRECISE DETERMINATION OF FREQUENCY

Charles W. McLeish, Billings Bridge, Ontario, and Dale H. Rumble, Manotick, Ontario, Canada, assignors to National Research Council, Ottawa, Ontario, Canada, a body corporate of Canada Application February 2, 1953, Serial No. 334,604

7 Claims. (Cl. 324—79)

This invention relates to a device for the precise determination of frequency, and is particularly suited for the detetermination of the frequency of a radio-frequency oscillator, but is not restricted thereto.

The device described herein determines frequency by means of stroboscopic frequency interpolation. A frequency standard is used which generates some convenient standard frequency, for example 100 kilocycles, and a line spectrum of harmonics are produced at equal intervals, which, for example, with a standard of 100 kilocycles would be at 100 kilocycle intervals. It is assumed that the frequency to be accurately determined is known with sufficient accuracy to identify the particular spectrum line produced from the frequency standard which is nearest to the frequency to be determined, and the device described herein carries out an exact interpolation between the harmonics, and displays this, for example, by means of a pointer rotating in relation to a fixed dial and a flash tube.

A principal object of this invention is to provide a device which is capable of determining frequency to a high degree of accuracy.

A further object is to provide such a device which is relatively simple to construct and maintain in comparison with prior frequency-determining devices.

An additional object is to provide a frequency-determining device which is easily and quickly read, and which may be easily operated by persons having no previous training.

It is also an object of the present invention to provide means whereby the frequency of more than one radio-frequency source may be determined simultaneously.

Other objects will be apparent to one skilled in the art from an examination of the present specification, and the accompanying drawings.

The invention will now be described with the assistance of the accompanying drawings wherein, Figure 1 shows in block diagram form a preferred embodiment of the present invention;

Figure 3 shows one form of the indicating device associated with dial 16 illustrated in Figures 1 and 2, and Figure 4 shows a fragmentary cross-sectional view of part of the indicating device illustrated in Figure 3.

Figure 2:
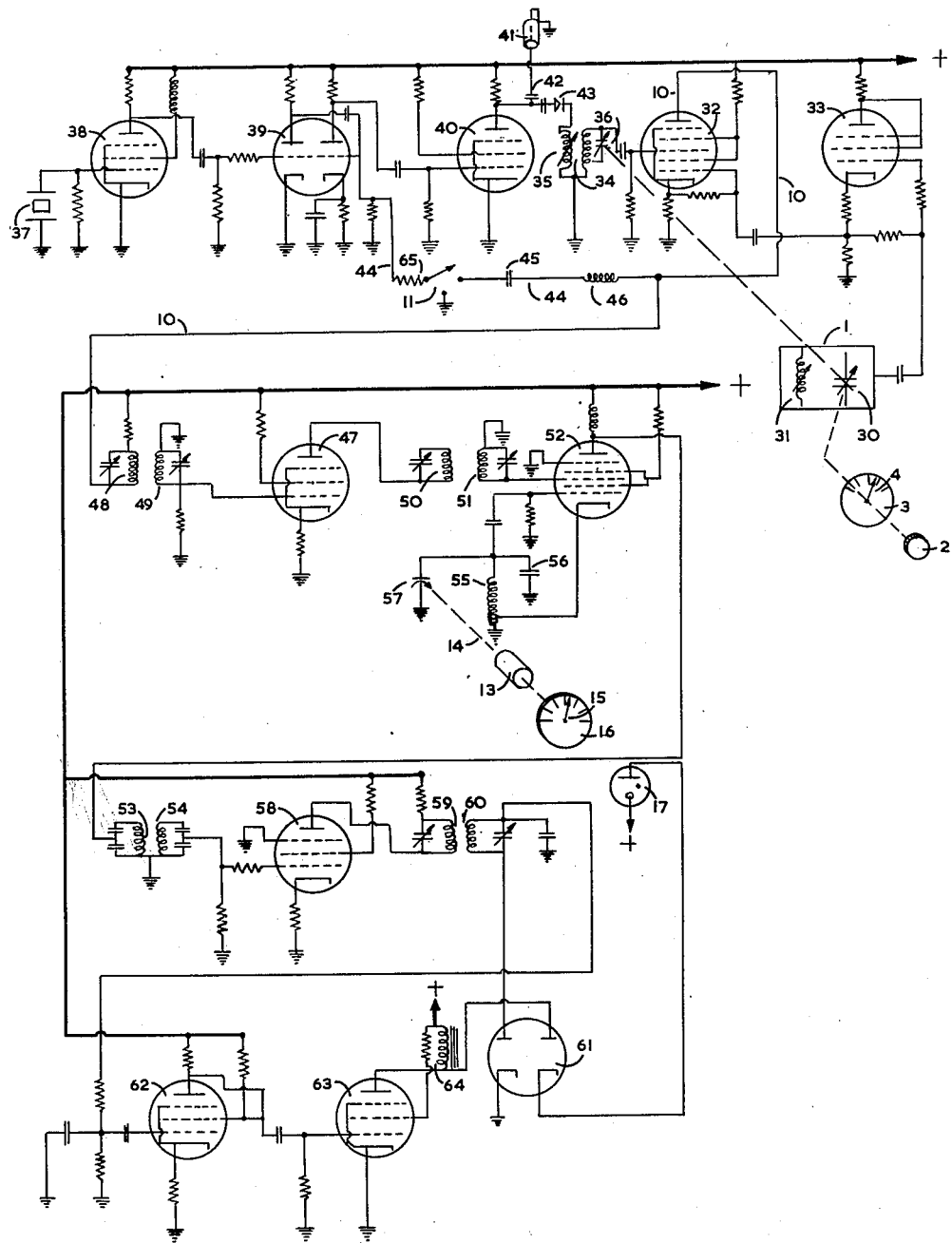
Figure 2 shows in greater detail typical circuitry for the device illustrated in Figure 1.

In the drawings, wherein the same parts are indicated by identical reference numerals, the oscillator or other source of frequency to be measured is shown at 1. Oscillator 1 is tuned by means of a knob shown at 2, having a dial and pointer associated therewith shown at 3 and 4 respectively. It is contemplated that the dial 3 will be suitably graduated so as to give a rough approximation of the frequency, for example to the nearest 100 kilocycles and by means of other parts of the device to be described below the exact frequency, for example to the nearest kilocycle will be indicated.

Oscillator 1 is connected to a mixer and spectrum selector shown at 5, and denoted as mixer 5. It is not necessary that all of the output of oscillator 1 be fed to mixer 5. It is possible to take a normal output from the line connecting oscillator 1 to mixer 5, at a line indicated by 6, and in the case where oscillator 1 were used to feed a radio transmitter or other utilization means, the embodiment of the invention described herein could be used to monitor such transmitter or other means without interferring with its operation.

A source of reference frequency harmoics is shown at 7, denoted as spectrum generator 7.

It is contemplated that mixer 5 will have a tuning element continuously matched to oscillator 1 whereby a certain portion of the spectrum, either above or below the frequency of oscillator 1, produced by spectrum generator 7 may be accepted. The selection provided by mixer 5 removes the ambiguity which would be present if discrimination were not provided between spectrum lines above and below the frequency of oscillator 1. It is convenient if adjusting knob 2 be so connected to such tuning element and to such spectrum selecting device that when the frequency of oscillator 1 is varied the mixer 5 is properly matched and the appropriate spectrum portion is selected. This is accomplished by suitable ganging, indicated by the dotted line 8, which will be apparent to one skilled in the art.

The output of mixer 5 will contain beat frequencies, one of which will be the difference between the frequency of oscillator 1 and the frequency of spectrum generator 7, and such output is applied to a broad-band intermediate frequency amplifier shown at 9. The function of amplifier 9 is to select from the output of mixer 5, by virtue of amplifier 9 having a bandwidth slightly greater than the frequency interval between two spectrum lines, a portion of the spectrum containing at least one beat frequency produced by mixer 5. As oscillator 1 is varied, the said beat frequency moves across the bandwidth of amplifier 9, and as the said beat frequency approaches the upper limit of the bandwidth, a second beat frequency appears at the lower limit of the bandwidth. Because the bandwidth of amplifier 9 is slightly greater than the frequency interval between spectrum lines, two beat frequencies can be present simultaneously in the bandwidth, one near the lower limit and the other near the upper limit. In addition, it is preferable if a connection be made by means of a line shown at 10 between spectrum generator 7 and amplifier 9, such line having therein a switch denoted by 11. This is for the purpose of calibration, and will be referred to in greater detail below.

As already stated amplifier 9 is a broad-band intermediate-frequency amplifier and it is preferable if amplifier 9 has its central frequency midway between any two lines of the spectrum produced by spectrum generator 7, these two frequencies being admitted as required for calibration by switch 11, and having a band-width slightly greater than the spacing between the spectrum lines.

A frequency converter or combined sweep oscillator and mixer is shown at 12. Frequency converter 12 performs the functions of a sweep oscillator and mixer and separate elements could be used if desired, but it has been found more convenient to combine them into a single frequency converter. In any event it is contemplated that a frequency will be generated in converter 12, that such frequency will be modulated, as by the mechanical rotation of a variable capacitor, and such modulated frequency will be mixed with the output of amplifier 9.

A motor shown at 13 is capable of continually sweeping the modulation of the frequency generated in converter 12 through a certain frequency band. Also driven by motor 13 by means of a shaft indicated by a dotted line at 14 is a pointer denoted by 15 which rotates over a stationary scale denoted by 16. A flash tube denoted by 17 is mounted in front of scale 16, and it will be apparent that if flash tube 17 flashes at the same point of rotation during each revolution, pointer 15 will appear to be stationary in relation to dial 16.

The output of frequency converter 12 is fed to a narrow-band intermediate frequency amplifier denoted by 18, and the output of amplifier 18 is fed to a detector denoted by 19. The output of detector 19 is amplified by an amplifier shown at 20 and applied to a trigger circuit denoted by 21.

The output of trigger circuit 21 is conducted by means of a line denoted by 22 to flash tube 17.

Attention is directed to the fact that the output of frequency converter 12 is fed to narrow-band intermediate frequency amplifier 18, and obviously amplifier 18 can only accept radio frequency energy applied thereto from frequency converter 12 if such energy is at the predetermined accepable frequency. Accordingly, amplifier 18 acts as a "searching slit" which inspects periodically, at the rotation rate of motor 13, the frequency applied by frequency converter 12 to amplifier 18.

If the beat frequency passed by amplifier 9 is close to the lower limit of the bandwidth of amplifier 9, amplifier 18, because of its narrow bandwidth, will pass energy for a short interval and at a time which is "early" in relation to the rotation of pointer 15, and the flash tube 17 will illuminate the pointer 15 at a position where pointer 15 has swept through only a small angle. On the other hand, if the beat frequency passed by amplifier 9 is near the upper limit of the bandwidth of amplifier 9, the amplifier 18 will not pass energy from frequency converter 12 until a "later" position in the rotation of motor 13, and pointer 15 will accordingly be illuminated at a position where it has swept through a greater angle than in the previous instance. It will be readily visualized that exact interpolation of frequency of oscillator 1 is thus possible in relation to spectrum lines from spectrum generator 7.

The rate of rotation of motor 13 is immaterial to the operation of the device so long as the speed is within very wide limits, governed by the following considerations: if the speed of rotation of motor 13 is of the order of only 5 to 10 revolutions per second, there will be objectionable flicker of the illumination of pointer 15, and if the speed of motor 13 is made very high, there will be shock excitation of amplifier 18 and the circuitry connecting amplifier 18 to flash tube 17, which can cause the stroboscopic effect to be "smeared."

Motor 13 thus serves only as a device to sweep both the reading scale and converter 12 simultaneously, and the speed merely has to be selected to be appropriate to produce a repetition rate of a suitable value.

It may be pointed out that in addition to the required trigger pulse which occurs once during each rotation of motor 13 and which is used to illuminate flash lamp 17 at the proper interval of time, there is also an unwanted trigger pulse which also occurs once in each rotation of motor 13 when the frequency of converter 12 is being returned from its upper value to its lower value in order to begin the next sweep. This is equivalent to "fly-back" time in relation to sweep circuits for cathode ray tubes.

It will be apparent that the unwanted trigger pulse will produce an additional illumination of pointer 15, but fortunately this occurs at some distance from the required illumination and can be easily blanked out by masking scale 16 over the region where such unwanted illumination would occur.

The operation of trigger circuit 21 is such as to cause flash tube 17 to fire for a very brief period of time so that there will not be any ambiguity in the stroboscopic illumination of pointer 15.

Attention is directed to the means for displaying the precise frequency, comprising in Figure 1 the pointer 15, the dial 16 and the flash tube 17. While these elements have only been shown schematically, a practical form thereof would be easy to realize. In practice it is preferable if a mask be placed over the lower part of dial 16, otherwise spurious flashes of tube 17 such as result from the unwanted trigger pulse, previously referred to, may cause the hand 15 to appear to be stopped over the lower portion of dial 16, and this could possibly be confusing to the observer. Further, it is preferable in the embodiment shown in Figure 1, if a reflector be placed in front of flash tube 17. Such a reflector intensifies the light from flash tube 17 shining on dial 16, and also prevents such light from reaching the eye of the observer directly.

Referring to Figure 2 where the circuit of the embodiment of the invention illustrated in Figure 1 is shown in detail, the oscillator 1 is shown with a variable capacitance denoted by 30 and a variable inductance denoted by 31. The other parts of oscillator 1 are not shown because the present invention is not concerned with the type of oscillator the frequency of which is to be measured.

The mixer 5 has as its principal element a mixer tube denoted by 32 of conventional type. Oscillator 1 is connected to mixer 4 through a cathode follower formed by the tube shown at 33 and its associated elements. The purpose of the use of such a cathode follower is to couple the oscillator 1 to mixer 5 and still isolate them sufficiently that the harmonics produced by spectrum generator 7 do not find their way into oscillator 1 which would have the effect of upsetting the operation of oscillator 1.

Mixer 5 has a tunable circuit for selecting the desired spectrum line produced by spectrum generator 7, in the form of a radio-frequency transformer having windings 34 and 35, and a variable capacitor denoted by 36.

The tuning elements shown in Figure 1 associated with control knob 2 change the capacitance of variable capacitors 30 and 36 as indicated by the dotted line in Figure 2, thus keeping mixer 6 properly matched to oscillator 1.

The spectrum generator 7 will now be referred to in greater detail with reference to Figure 2. The principal components of spectrum generator 7 are a crystal denoted by 37, an oscillator tube denoted by 38, an amplifier tube denoted by 39 and a pulser circuit having as its principal components tube 40 and delay line 41.

The function of the spectrum generator 7 is to produce oscillations by means of crystal 37 and tube 38, and to amplify the harmonics so produced such that spectrum lines of the desired interval are obtained.

The circuitry combining crystal 37 and tube 38 is quite conventional and need not be further described. The output from tube 38 is applied to the two-stage amplifier formed by the double triode elements of tube 39 and the circuitry associated with the latter. Such amplifier is also quite conventional and for the present purpose the important feature is that the amplifier stages associated with tube 39 are overdriven so as to accentuate the harmonics produced by the crystal oscillator circuit associated with crystal 37.

The output from the triode elements on the right-hand side of tube 39 is applied to the pulser circuit including tube 40 and delay line 41 whereby all the harmonics desired for the working range of oscillator 1 are formed by the generation of appropriate pulses, which pulses are applied to mixer 5 through a capacitor denoted by 42 and a crystal rectifier denoted by 43.

The output of the mixer 5 is taken from the anode of tube 32 by means of the line denoted by 10.

In order to assist in calibration, a second output is taken from the anode of the tube elements on the left-hand side of tube 39 by means of the line denoted by 44, and switch 11 is interposed in line 44. Capacitor 45, inductance 46 and resistor 65 are preferably inserted in line 44 as shown, this not having been indicated in Figure 1 in the interest of simplicity. Line 44 makes suitable connection with line 10, and it will be apparent that by a suitable operation of switch 11, outputs may be received on both lines 10 and 44, or on line 10 alone.

Mixer 5 is connected to broad band intermediate frequency amplifier 9 by means of line 10 and spectrum generator 7 is also connected to amplifier 9 when switch 11 is suitably positioned. With reference to Figure 2, amplifier 9 has as its central element tube 47, and has an input transformer having windings 48 and 49, and an output transformer having windings 50 and 51.

Amplifier 9 is connected to a frequency converter 12, which as already noted, combines the functions of an oscillator, modulator and mixer, although there is no reason why these elements could not be in the form of separate units. A saving in the number of tubes required and the complication of the circuitry will however be achieved if such a combined frequency converter is used. The frequency converter 12 makes use of a tube denoted by 52, the input to which is received from the winding 51 of the transformer already referred to, and the output from which is delivered to a winding denoted by 53 of an additional transformer to be referred to later having also winding 54. The principal frequency determining elements of the frequency converter 12 are the inductance shown at 55 and the capacitor shown at 56. An additional sweeping capacitor is shown at 57, and it will be apparent that by continuously varying the capacitance of capacitor 57, the total frequency-determining capacitance of the circuit can be continuously varied, thereby modulating the oscillations produced over a predetermined range.

It is contemplated that variable capacitor 57 will be rotated by means of motor 13.

The output of the frequency converter 12 is applied to the narrow-band intermediate frequency amplifier 18, which as shown in Figure 2 has as its central component tube 58.

The input of amplifier 18 is received at winding 54 already referred to, and the output is delivered at the winding 59 of the transformer there shown which also has the winding denoted by 60.

The output of amplifier 18 is applied to detector 19 which may consist of diode elements which, in the present embodiment makes use of the left-hand elements of the double diode tube denoted by 61.

The output of detector 19 is applied to a pulse audio amplifier 20 having as its chief components tubes 62 and 63.

The output of pulse audio amplifier 20 is applied to a trigger circuit 21 which may comprise as inductance denoted by 64 and a diode, which latter may be in the form of the right-hand diode elements of double diode tube 61.

The output of trigger circuit 21 is applied to flash tube 17 already referred to.

The function of the inductance 64 in the trigger circuit 21 is to provide a high response frequency arising from the fact that the inductance 61 is first driven negative then positive sharply in such a manner that the positive pulse rises almost vertically. There is an important advantage in providing that the positive pulse rises veritcally in that if there is slight variation in the voltage at which tube 17 flashes, if the positive pulse rises vertically it is immaterial at exactly what voltage the tube fires. By virtue of the vertical nature of the positive pulse the time will be substantially the same regardless of the firing voltage of tube 17.

In describing the circuitry of Figure 2 the values of the circuit components have not been stated in detail, because their values would be apparent to one skilled in the art. However, in order to cause the circuit to function efficiently, the circuit components can have values which will give relative characteristics to the circuit elements which will be hereinafter described.

It will be assumed that the frequency of oscillator 1 can be read to a degree of accuracy which will have an uncertain factor which will be denoted as ± X kilocycles. In such a case the spectrum generator 7 should produce a line spectrum of frequencies having an interval which will be denoted as Y of at least 2X kilocycles, and for ease of operation, as great as 4X kilocycles. It will be apparent that if the frequency from oscillator 1 is beat with the spectrum lines of line spectrum generator 6, the output of mixer 5 will be in the form of spectrum lines which are the same interval apart, namely 2Y kilocycles, but there will of course be a frequency difference on account of the beating action of the mixer 5.

The intermediate frequency amplifier 9 will preferably have a bandwidth slightly greater than Y kilocycles, and will preferably be centered at a frequency midway between any two lines of the spectrum, preferably outside the range of oscillator 1, as will be apparent to one skilled in the art.

The frequency converter 12 will preferably generate a modulated frequency somewhat lower than the output of the broad band amplifier 7 and modulated over a frequency range of slightly more than Y kilocycles. It will be assumed that the central frequency about which modulation takes place is lower than the output of broad band amplifier 7 by an amount which will be denoted as Z kilocycles. Because of the mixing action of the frequency converter 12, it will be apparent that a beat note of the frequency Z kilocycles will be produced whenever a spectrum line is swept through, and it is important to note that the time at which frequency Z is so produced is quite independent of the speed of motor 13.

The narrow band intermediate-frequency amplifier 20 is centered at a frequency of Z kilocycles and will have a very narrow band width of, for example $$\frac{Y}{200} \text{ kilocycles}$$

in order to accurately determine the point of rotation of capacitor 57 where a spectrum line is swept through.

The values of the components of the detector, amplifier and trigger circuits 19, 20 and 21 respectively will be merely those which would be appropriate to the values determined by the foregoing components.

Purely by way of example and without in any way restricting the scope of the invention, a list of typical frequency values will now be given.

*Example*

The oscillator 1 had an approximate frequency of 20160 kilocycles with an uncertainty of reading of ±25 kilocycles the spectrum generator 7 produced a spectrum having an interval of 100 kilocycles, the spectrum line selected by the tuned circuit formed by transformer winding 34 and variable capacitor 36 for measuring being the one at 18200 kilocycles.

It is apparent that from the mixer 5 was produced a beat frequency of 1960 kilocycles for such selected spectrum line.

The broad band intermediate frequency amplifier 9 had a band-width of slightly more than 100 kilocycles and was centered at 1950 kilocycles.

The frequency converter 12 produced a frequency modulated beat note varying from 135 to 235 kilocycles arising because of the swept frequency which was modulated from 1725 to 1825 kilocycles, and each time the frequency of 1960 kilocycles was swept through a pulse of radio frequency energy at 175 kilocycles was produced at the output of amplifier 20, the bandwidth of which was approximately 900 cycles, centered at 175 kilocycles.

At each revolution of motor 13, this pulse occurred at a certain position of the pointer 15 with relation to the dial 16. The scale was calibrated from zero kilocycles to 100 kilocycles and the pointer was then illuminated at 60 kilocycles. The frequency of oscillator 1 in hundreds of kilocycles was then read on dial 3, and the precise frequency in kilocycles was read on dial 16.

One of the advantages of the device herein described is that it is possible to monitor more than one source of radio frequency simultaneously. With some added complication of trigger circuit 21 enabling it to recover quickly from the effects of the discharge of flash tube 17, which will be apparent to one skilled in the art, the system is capable of indicating simultaneously several frequencies spaced by a frequency difference less than the sweeping range of frequency converter 12 as determined by the modulation produced by sweeping capacitor 57.

Again, with added complication of additional mixers, such as mixer 5, and additional tuned circuits, as will be apparent to one skilled in the art, several frequencies may be measured simultaneously with the restriction that they do not lie within ±Y/2 kilocycles of the centre frequency of broad band amplifier 9 where a direct beat between them would produce spurious responses as well as the desired ones. For example if there are two or more oscillators such as oscillator 1 which are tuned to a frequency not differing by more than the sweeping range of frequency converter 12, such oscillators can be connected to the line passing to the control grid of tube 33 as is oscillator 1 as shown in Figure 2. In this case positions will be denoted on dial 16 corresponding to the frequencies of each of the oscillators similar to oscillator 1.

If on the other hand, it is desired to monitor the frequency of a plurality of oscillators whose frequencies differ by more than the sweeping range of frequency converter 12, but not within ±Y/2 kilocycles at the centre of broad band amplifier 9, this may still be done but it is necessary to provide a set of components corresponding to tubes 32 and 33, the transformer having windings 34 and 35 and their associated elements connected to crystal rectifier 43 for each of the oscillators measured. This, however, occasions no particular difficulty and a plurality of oscillators such as oscillator 1 with circuitry components as described, may be connected severally to crystal rectifier 43 and the device functions in substantially the same manner as that described.

Prior art devices do not have this characteristic of being able to monitor a plurality of sources of radio frequency.

A preferred embodiment of the means for displaying the precise frequency will now be referred to. It will be apparent that the use of a rotatably-modulated frequency converter and a stroboscopically-read dial is only one form of display which could be used. For example, a cathode-ray tube could be used for the display, and both the tube and the frequency converter 12 could be swept by an electronic sweep circuit. The apparatus described herein in detail has, however, been found preferable.

The means for displaying the precise frequency of oscillator 1 has already been referred to in connection with Figures 1 and 2. Another form which may be used as a substitute for the pointer 15, the dial 16 and the flash tube 17 will now be disclosed with reference to Figures 3 and 4.

Referring first to Figure 3, the motor 13 turning shaft 14 and the rotor of variable capacitor 57 have the same structure as that contemplated in Figures 1 and 2. Instead of a flash tube in front of the dial 16 and pointer 15, Figure 4 shows a pointer illuminated from within by a flash tube. In Figures 3 and 4 the pointer is indicated by reference numeral 66 and pointer 66 is preferably constructed of a transparent plastic material such as polystyrene which exhibits the well-known "light-pipe" effect.

Pointer 66 is suitably mounted in an opening in a collar denoted by 67 rigidly attached to shaft 14. One suitable method of such attachment is to have collar 67 and shaft 14 provided with matching threads as shown and a lock nut denoted by 68. The pointer 66 is preferably pointed and curved outwardly, for ease of viewing, in that the light is readily transmitted to the eye of the observer.

The opening in collar 67 wherein pointer 65 is mounted should extend from the outside to the inside of collar 67, and the flash bulb in this form of the device is mounted inside collar 67 and denoted by 69.

Flash bulb 69 is suitably suported so that it remains stationary and allows collar 67 to rotate therearound. To this end, the relative sizes of collar 67 and flash tube 69 are so chosen that there is ample clearance therebetween as shown in Figure 4.

A cover plate denoted by 70 is preferably mounted over the pointer 66 and the collar 67, and if desired, flash tube 69 may be mounted in an appropriate socket on cover plate 70, or a separate suspension may be provided. In either case the electrical leads for flash tube 69 must be carried to trigger circuit 21, but this presents no problem.

The cover plate 70 is preferably shaped so that it covers most of dial 16 except for a gap which may be substantially semi-circumferential, as shown. With the device as illustrated in Figures 3 and 4 there is no necessity of using a reflector for the flash tube, and the cover plate 70 forms a suitable mask.

In order to provide maximum illumination at the dial 16 it may be emphasized that it is preferable if in the region of dial 16 the pointer 66 be sharply pointed at its tip, and the tip be inclined toward cover plate 70. If this is done a relatively bright point of light will appear at the edge of dial 16.

It will be seen that the device described herein provides an improved means of frequency measurement, is of relatively simple construction, easy to operate and maintain and has numerous industrial and scientific applications.

What is claimed is:

1. A device for precise determination of the frequency of a source of electro-magnetic waves by stroboscopic interpolation of the frequency of said source in relation to frequency spectrum lines of a frequency standard, comprising a frequency standard generating a series of frequency spectrum lines of equal intervals, selecting and mixing means to receive the output of said source and said frequency standard for selecting a particular group of spectrum lines generated by said frequency standard and beating said group of spectrum lines with the frequency of said source, an amplifier having bandwidth at least as great as the interval of said spectrum lines for receiving beat frequency produced by said selecting and mixing means, a modulated oscillator, a second mixing means for receiving the output of said amplifier and said modulated oscillator to produce a modulated beat frequency, a narrow-band amplifier for receiving the output of said second mixing means, and indicating means for showing the frequency of said modulated oscillator at which energy is passed by said narrow-band amplifier, such frequency being a measure of the precise interpolation of the frequency of said source in relation to spectrum lines produced by said frequency standard.

2. A device according to claim 1 wherein there is a rotatable power means mechanically connected to said modulated oscillator and also to said indicating means.

3. A device according to claim 2 wherein said indicating means is mechanically rotatable and is turned by said power means, and includes a source of light.

4. A device for precise determination of the frequency of a source of electro-magnetic waves by stroboscopic interpolation of the frequency of said source in relation to frequency lines of a frequency standard, comprising a frequency standard generating a series of frequency spectrum lines of equal intervals, selecting and mixing means to receive the output of said source and said frequency standard for selecting a particular group of spectrum lines generated by said frequency standard and beating said group of spectrum lines with the frequency of said source, an amplifier having bandwidth at least as great as the interval of said spectrum lines for receiving said beat frequency produced by said selecting and mixing means, a modulated oscillator, a second mixing means for receiving the output of said amplifier and said modulated oscillator to produce a modulated beat frequency, a narrow-band amplifier for receiving the output of said second mixing means, indicating means for showing the frequency of said modulated oscillator at which energy is passed by said narrow-band amplifier, and pulsing means for applying the output of said narrow-band amplifier to said indicating means.

5. A device for precise determination of the frequency of a plurality of sources of electro-magnetic waves by stroboscopic interpolation of the frequency of said sources in relation to frequency spectrum lines of a frequency standard, comprising a frequency standard generating a series of frequency spectrum lines of equal intervals, selecting and mixing means to receive the output of said sources of electro-magnetic waves and said frequency standard for selecting particular groups of spectrum lines generated by said frequency standard and beating said groups of spectrum lines with the frequency of said sources to produce beat frequencies, an amplifier having bandwidth at least as great as the interval of said spectrum lines for receiving said beat frequencies produced by said selecting and mixing means, a modulated oscillator, a second mixing means for receiving the output of said amplifier and said modulated oscillator to produce modulated beat frequencies, a narrow-band amplifier for receiving the outputs of said second mixing means, indicating means for showing the frequencies of said modulated oscillator at which energy is passed by said narrow-band amplifier, and pulsing means for applying the outputs of said narrow-band amplifier to said indicating means.

6. A device for precise determination of the frequency of a source of electro-magnetic waves by stroboscopic interpolation of the frequency of said source in relation to frequency spectrum lines of a frequency standard comprising, a frequency standard generating frequency spectrum lines of equal interval, selecting and mixing means for selecting a particular group of spectrum lines generated by said frequency standard and beating said group of spectrum lines with the frequency produced by said source, said selecting and mixing means and said source being mechanically inter-connected such that varying the frequency of said source automatically selects a particular group of spectrum lines on one side of the frequency of said source, an amplifier having bandwidth at least as great as the interval of said spectrum lines for receiving beat frequency produced by said selecting and mixing means, a modulated oscillator driven by rotatable power means, a second mixing means for receiving the output of said amplifier and said modulated oscillator to produce a modulated beat frequency, a narrow-band amplifier for receiving the modulated beat frequency from said second mixing means; detecting means, amplifier means and trigger means connected in series to said narrow-band amplifier for receiving energy passed by said narrow-band amplifier and converting said energy into pulse capable of operating a flash tube, and flash tube connected to said trigger circuit, a moving hand connected to said motor and a dial capable of being swept by said hand, said hand and said dial being adjacent said flash utbe.

7. A device according to claim 6, wherein there is in addition masking means between said flash tube and a part of said dial for the purpose of eliminating undesired illumination of said hand.

References Cited in the file of this patent

UNITED STATES PATENTS

| | | |
|---|---|---|
| 2,071,284 | Hyland | Feb. 16, 1937 |
| 2,157,122 | Dunmore | May 9, 1939 |
| 2,617,939 | Nicolas | Nov. 11, 1952 |
| 2,629,829 | Daly | Feb. 24, 1953 |